3,641,062
CARBONATE ESTERS OF 3,5-DIHALO-4-HYDROXY-BENZONITRILES
Walter Ost, Klaus Thomas, Dietrich Jerchel, and Gerbert Linden, Ingelheim am Rhein, Germany, assignors to C. H. Boehringer Sohn, Ingelheim am Rhein, Germany
No Drawing. Filed Apr. 17, 1969, Ser. No. 817,159
Claims priority, application Austria, Apr. 17, 1968, A 3,744/68
Int. Cl. C07c 121/52; C07d 5/04; A01n 9/20
U.S. Cl. 260—347.4
5 Claims

ABSTRACT OF THE DISCLOSURE

Herbicidal 4-cyano-2,6-dihalo-phenyl carbonates of the formula

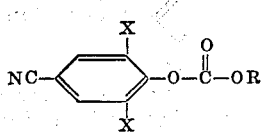

wherein
X is bromine or iodine, and
R is allyl, tetrahydrofurfuryl, phenyl, halophenyl, benzyl, 2,2,2-trichloroethyl or 2-methoxyethyl.

---

This invention relates to novel carbonic acid esters of halogenated p-hydroxy-benzonitriles, as well as to methods of preparing them.

THE PRIOR ART

It is known that 3,5-dihalo-4-hydroxy-benzonitriles, and particularly 3,5 - diiodo-4-hydroxy-benzonitrile (ioxynil) and 3,5-dibromo-4-hydroxy-benzonitrile (bromoxynil), exhibit herbicidal properties. However, experience has shown that these otherwise satisfactory herbicides are inadequately effective against certain kinds of common weeds, such as galium (catchweed) and alopecurus (foxtail).

OBJECTS OF THE INVENTION

It is an object of the present invention to provide herbicides of the 3,5-dihalo-4-hydroxy-benzonitrile class which are highly effective against a variety of common weeds, including galium and alopecurus.

Other objects and advantages of the invention will become apparent as the description thereof proceeds.

We have discovered that the herbicidal spectrum of ioxynil and bromoxynil is significantly broadened by converting the free phenols into mixed carbonic acid esters thereof.

Thus, the present invention relates to novel mixed carbonates of the formula

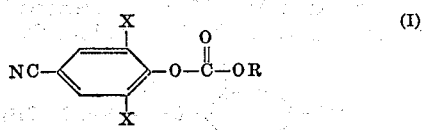

wherein
X is bromine or iodine, and
R is allyl, tetrahydrofurfuryl, phenyl, halo-phenyl; benzyl, 2,2,2-trichloroethyl or 2-methoxyethyl.

The compounds embraced by Formula I may be prepared by the following methods, which involve well known chemical principles:

Method A

By reacting a compound of the formula (II)

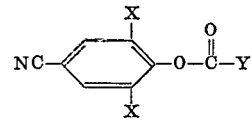

wherein X has the same meanings as in Formula I and Y is chlorine or bromine, with an alcohol of the formula

ROH    (III)

wherein R has the same meanings as in Formula I.

The reaction is preferably carried out in the presence of an inert organic solvent and of an organic or inorganic acid acceptor at a temperature of about −20 to +80° C., preferably at room temperature. The reaction may, however, also be performed without the presence of an acid acceptor; in that case it is advantageous to use as the solvent medium an excess of the alcohol of the Formula II and at a temperature between 20 and 180° C., preferably 50 to 120° C., whereby the liberated hydrogen halide escapes in gaseous form.

Method B

By reacting a compound of the formula (IV)

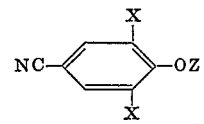

wherein X has the same meanings as in Formula I and Z is hydrogen or one equivalent of an inorganic or organic cation, such as lithium, sodium, potassium, calcium, barium, triethylamine, cyclohexylamine or ethanolamine, with a compound of the formula (V)

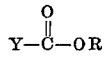

wherein R has the same meanings as in Formula I and Y has the same meanings as in Formula II.

The reaction is carried out in an aqueous or organic solvent and at a temperature between about −20 and +80° C., preferably room temperature. In those instances where Z is hydrogen, the reaction is preferably carried out in the presence of an inorganic or organic acid acceptor, such as sodium hydroxide, sodium carbonate, triethylamine or pyridine.

The following examples further illustrate the present invention and will enable others skilled in the art to understand it more completely. It should be understood, however, that the invention is not limited solely to the particular examples given below.

EXAMPLE 1

Preparation of (4-cyano-2,6-dibromo-phenyl)-allylcarbonate by Method B

A solution of 7.2 gm. (0.06 mol) of allyl chloroformate in 50 cc. of dioxane was added dropwise to a mixture of 16.6 gm. (0.06 mol) of 4-cyano-2,6-dibromophenol, 6.1 gm. (0.06 mol) of triethylamine and 50 cc. of dioxane, accompanied by stirring and exterior cooling to keep the internal temperature of the reaction mixture between 15 and 20° C. After all of the allyl chloroformate solution had been added, the reaction mixture was stirred for two hours more at room temperature, and then the triethylamine hydrochloride which had precipitated out was separated from the liquid phase by vacuum filtration. The filtrate was evaporated in vacuo, and the crystalline residue was recrystallized from gasoline. 13.5 gm. (62% of theory) of (4-cyano-2,6-dibromo-phenyl)-allyl-carbonate, M.P. 83–84° C., of the formula

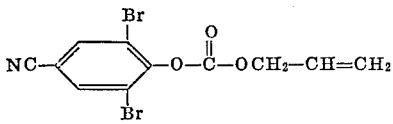

were obtained.

EXAMPLE 2

Using a procedure analogous to that described in Example 1, (4-cyano - 2,6 - diiodo-phenyl)allyl-carbonate, M.P. 118–120° C., of the formula

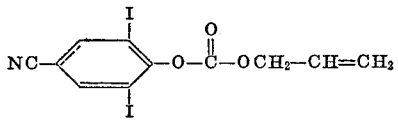

was prepared from 1000 gm. (2.7 mols) of 4-cyano-2,6-diiodophenol, 360 gm. (3.0 mols) of allyl chloroformate and 303 gm. (3.0 mols) of triethylamine, using 2300 cc. of tetrahydrofuran as the solvent medium. The crystalline raw product was recrystallized from gasoline. The yield was 1,050 gm. (85° theory).

EXAMPLE 3

Using a procedure analogous to that described in Example 1, (4 - cyano-2,6-dibromo-phenyl)-tetrahydrofurfurylcarbonate, B.P. 179–182° C. at 0.15 mm. Hg and 259–260° C. at 14 mm. Hg, of the formula

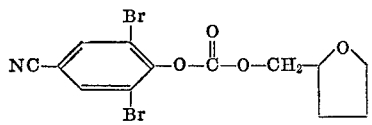

were prepared from 554 gm. (2 mols) of 4-cyano-2,6-dibromo-phenol, 364 gm. (2.2 mols) of tetrahydrofurfuryl chloroformate and 222 gm. (2.2 mols) of triethylamine in 1800 cc. of tetrahydrofuran. The oily raw product was distilled in vacuo.

EXAMPLE 4

Using a procedure analogous to that described in Example 1, (4-cyano-2,6-diiodo-phenyl)-tetrahydrofurfuryl-carbonate, M.P. 93–95° C. (recrystallized from gasoline), was prepared from 4-cyano-2,6-diiodo-phenol and tetrahydrofurfuryl chloroformate. The yield was 70% of theory.

EXAMPLE 5

Using a procedure analogous to that described in Example 1, (4-cyano-2,6-dibromo-phenyl)-phenyl-carbonate, M.P. 104–105° C. (recrystallized from gasoline), of the formula

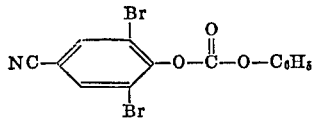

was prepared from 4-cyano-2,6-dibromo-penol and phenyl chloroformate. The yield was 67% of theory.

EXAMPLE 6

Using a procedure analogous to that described in Example 1, (4-cyano-2,6-diiodo-phenyl)-phenyl-carbonate, M.P. 95–97° C. (recrystallized from ethyl acetate/petroleum ether), was prepared from 4-cyano-2,6-diiodo-phenol and phenyl chloroformate. The yield was 65% of theory.

EXAMPLE 7

Using a procedure analogous to that described in Example 1, (4-cyano-2,6-dibromo-phenyl)-(p-chlorophenyl)-carbonate, M.P. 110–111° C. (recrystallized from gasoline), of the formula

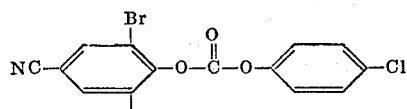

was prepared from 4-cyano-2,6-dibromo-phenol and p-chlorophenyl chloroformate. The yield was 89% of theory.

EXAMPLE 8

Using a procedure analogous to that described in Example 1, (4-cyano-2,6-dibromo-penyl)-benzyl-carbonate, M.P. 105–108° C. (recrystallised from gasoline), of the formula

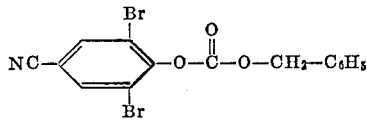

was prepared from 4-cyano-2,6-dibromo-phenol and benzyl chloroformate. The yield was 60% of theory.

EXAMPLE 9

Using a procedure analogous to that described in Example 1, (4 - cyano-2,6-diiodo-phenyl)-benzyl-carbonate, M.P. 100–102° C. (recrystallized from gasoline), was prepared from 4-cyano-2,6-diiodo-phenol and benzyl chloroformate. The yield was 62% of theory.

EXAMPLE 10

Using a procedure analogous to that described in Example 1, (4'-cyano-2',6'-dibromo-phenyl)-2,2,2-trichloroethyl-carbonate, M.P. 124–126° C. (recrystallized from gasoline), of the formula

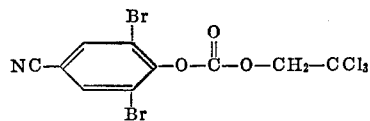

was prepared from 4-cyano-2,6-dibromo-phenol and 2,2, 2-trichloroethyl chloroformate. The yield was 58% of theory.

EXAMPLE 11

Using a procedure analogous to that described in Example 1, (4' - cyano-2',6'-diiodo-phenyl)-2,2,2-trichloroethyl-carbonate, M.P. 131–133° C. (recrystallized from gasoline), was prepared from 4-cyano-2,6-diiodo-phenol and 2,2,2-trichloroethyl chloroformate. The yield was 65% of theory.

EXAMPLE 12

Using a procedure analogous to that described in Example 1, (4'-cyano-2',6'-dibromo-phenyl) - 2 - methoxyethylcarbonate, M.P. 79–80° C. (recrystallized from ethyl acetate/petroleum ether), of the formula

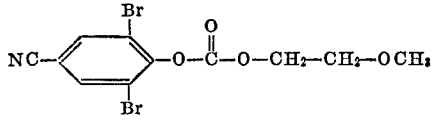

was prepared from 4-cyano-2,6-dibromo-phenol and 2-methoxyethyl chloroformate. The yield was 78% of theory.

EXAMPLE 13

Using a procedure analogous to that described in Example 1, (4'-cyano-2',6'-diiodo-phenyl)-2-methoxyethyl-carbonate, M.P. 90–91° C. (recrystallized from ethyl acetate/petroleum ether), was prepared from 4-cyano-2,6-diiodophenol and 2-methoxyethyl chloroformate. The yield was 60% of theory.

As indicated above, the compounds according to the present invention, that is, those embraced by Formula I above, have useful selective herbicidal properties. More particularly, they are effective against broad-leaf weeds, such as veronica, stellaria, fagopyrum, centaurea, galium and alopecurus.

Particularly effective are those compounds of the Formula I wherein R is allyl or tetrahydrofurfuryl.

The compounds of the invention were tested for herbicidal activity under greenhouse as well as field conditions.

The following Table A shows the herbicidal effectiveness of the compounds of Examples 1 and 2 above, bromoxynil and ioxynil against various weeds under greenhouse conditions. The numbers ranging from 1 to 9 in the columns under the names of the weeds as well as in the subsequent tables indicate the degree of herbicidal effectiveness as follows: 1=100% weed eradication; 9=0% weed eradication.

TABLE C

| Weed | Compound of Example— | | | | Ioxynil |
|---|---|---|---|---|---|
| | 2 | 6 | 11 | 13 | |
| Galium: | | | | | |
| 0.2 kg./ha | 1 | 1 | 1 | 1 | 4 |
| 0.75 kg./ha | 1 | N.t. | N.t. | 1 | 2 |
| Alopecurus: | | | | | |
| 0.75 kg./ha | 5 | N.t. | N.t. | 4 | 6 |
| 1.5 kg./ha | 4 | N.t. | N.t. | 3 | 6 |

NOTE.—N.t.=not tested.

The herbicidal effect of some of the (4-cyano-2,6-dibromophenyl)-carbonates acid esters according to the invention on galium and alopecurus in the greenhouse in comparison to bromoxynil is shown in Table D.

TABLE D

| Weed | Compound of Example— | | | | Bromoxynil |
|---|---|---|---|---|---|
| | 1 | 3 | 8 | 12 | |
| Galium: | | | | | |
| 0.2 kg./ha | 5 | 4 | 2 | 7 | 8 |
| 0.75 kg./ha | 2 | 2 | N.t. | 2 | 8 |
| Alopecurus: | | | | | |
| 0.75 kg./ha | 5 | 3 | 5 | 6 | 9 |
| 1.5 kg./ha | 2 | 3 | 3 | 4 | 8 |

NOTE.—N.t.=not tested.

TABLE A

| Compound | Weed | | | | | |
|---|---|---|---|---|---|---|
| | Amaranth | Corn flower (Centaurea) | Charlock | Catchweed (Galium) | Speedwell (Veronica) | Chickweed (Stellaria) |
| Compound of Example 1: | | | | | | |
| 0.05 kg./ha | 8 | 1 | 1 | 7 | 6 | 6 |
| 0.2 kg./ha | 6 | 1 | 1 | 2 | 1 | 4 |
| Compound of Example 2: | | | | | | |
| 0.05 kg./ha | 3 | 4 | 1 | 5 | 1 | 1 |
| 0.2 kg./ha | 1 | 1 | 1 | 1 | 1 | 1 |
| Bromoxynil: | | | | | | |
| 0.05 kg./ha | 8 | 6 | 1 | 8 | 8 | 7 |
| 0.2 kg./ha | 7 | 1 | 1 | 5 | 2 | 4 |
| Ioxynil: | | | | | | |
| 0.05 kg./ha | 9 | 7 | 4 | 9 | 9 | 8 |
| 0.2 kg./ha | 4 | 7 | 1 | 9 | 4 | 2 |

The herbicidal effect of several other compounds according to the invention on weeds on the greenhouse in comparison to ioxynil is shown in Table B.

TABLE B

| Weed | Compound of Example— | | | | | | | Ioxynil |
|---|---|---|---|---|---|---|---|---|
| | 5 | 6 | 7 | 8 | 9 | 12 | 13 | |
| Solanum lyc.: | | | | | | | | |
| 0.05 kg./ha | 7 | 7 | 6 | 4 | 7 | 6 | 1 | 8 |
| 0.2 kg./ha | 1 | 1 | 1 | 1 | 1 | 1 | 1 | 5 |
| Fagopyrum esc.: | | | | | | | | |
| 0.05 kg./ha | N.t. | 1 | 1 | 1 | 1 | 1 | 1 | 1 |
| 0.2 kg./ha | N.t. | 1 | 1 | 1 | 1 | 1 | 1 | 1 |
| Amaranthus: | | | | | | | | |
| 0.05 kg./ha | N.t. | 4 | N.t. | N.t. | 2 | N.t. | 2 | 7 |
| 0.2 kg./ha | N.t. | 1 | N.t. | N.t. | 1 | N.t. | 1 | 2 |

NOTE.—N.t.=not tested.

TABLE E

| Cereal | Weed | Herbicidal effectiveness | Quantity used in kg./ha. | | | |
|---|---|---|---|---|---|---|
| | | | Ex. 3 | Ex. 4 | Ioxynil | Bromoxynil |
| Oats | Matricaria | 1 | 0.55 | N.t. | N.t. | 0.8 |
| Do | Chenopodium | 4 | 0.2 | 0.4 | 0.9 | N.t. |
| Winter barley | Papaver | 4 | 0.6 | 0.8 | 1.2 | N.t. |
| Summer barley | Chrysanthemum | 7 | 0.6 | 0.6 | 1.2 | 1 |
| Oats/barley | Galeopsis | 4 | 1 | 0.9 | N.t. | 1.2 |
| Corn | Sinapis | 4 | 0.3 | 0.4 | 1 | N.t. |

NOTE.—N.t.=not tested.

Table C shows the herbicidal effect of some of the (4-cyano-2,6-diiodophenyl)-carbonates according to the invention against galium (catchweed) and alopecurus (black grass) in the greenhouse in comparison to ioxynil.

Table E shows the minimum dosage of the compounds of Examples 3 and 4 according to the invention to attain sufficient extermination against various weeds growing in corn fields, compared to ioxynil or bromoxynil.

For herbicidal purposes the compounds according to the present invention are compounded into customary forms of herbicidal compositions, such as solutions, emulsion concentrates, wettable suspension powders, granulates and sprays, which are then applied in the usual manner to the weed-infested areas after dilution with a suitable diluent, if necessary, especially water. The effective rate of application is about 0.5 to 2 kg./hectare, and the preferred concentration of the compounds in the herbicidal compositions is about 0.001 to 2% by weight.

The following examples illustrate a few herbicidal compositions comprising a compound of the present invention as the herbicidal ingredient. The parts are parts by weight.

EXAMPLE 14

Emulsion concentrate

The concentrate was compounded in customary fashion from the following ingredients:

| | Parts |
|---|---|
| (4-cyano-2,6-dibromo-phenyl)-allyl-carbonate | 20.0 |
| High-boiling-point aromatic solvent (Shellsol A) | 68.8 |
| Tensiofix AS | 6.7 |
| Tensiofix BS | 3.3 |

The concentrate was diluted with water to the desired active ingredient concentration (at least 0.001% by weight), and the resulting aqueous emulsion was sprayed on a weed-infested area at the rate of 0.5 kg. of active ingredient per hectare. Very good herbicidal effects were obtained, especially against gallium and alopecurus.

EXAMPLE 15

Wettable suspension powder

The powder was compounded from the following ingredients:

| | Parts |
|---|---|
| (4-cyano-2,6-dibromo-phenyl)-tetrahydrofurfuryl-carbonate | 48.0 |
| Collex 4/5 | 8.0 |
| Siliceous chalk | 32.0 |
| Atlox 4860 | 2.0 |
| Sodium sulfate | 10.0 |

The ingredients were admixed with each other, the mixture was milled into a homogeneous powder, and the powder was suspended in a sufficient amount of water to make the active ingredient concentration at least 0.001% by weight. The aqueous suspension was sprayed on a weed-infested area at the rate of 0.5 kg. of active ingredient per hectare and produced very good herbicidal effects, especially against gallium and alopecurus.

Analogous results were obtained when any one of the other compounds embraced by Formula I above was substituted for the particular carbonate in Examples 14 and 15.

We claim:
1. A compound of the formula

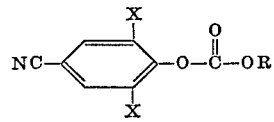

wherein
X is bromine or iodine, and
R is allyl, tetrahydrofurfuryl, phenyl, chlorophenyl, benzyl, 2,2,2-trichloroethyl or 2-methoxyethyl.

2. A compound according to claim 1, wherein X is bromine and R is allyl.
3. A compound according to claim 1, wherein X is bromine and R is tetrahydrofurfuryl.
4. A compound according to claim 1, wherein X is iodine and R is allyl.
5. A compound according to claim 1, wherein X is iodine and R is tetrahydrofurfuryl.

References Cited

Chemical Abstracts: vol. 62, 3982-3 (1965).

LEWIS GOTTS, Primary Examiner

D. G. RIVERS, Assistant Examiner

U.S. Cl. X.R.

71—88, 105; 260—463